United States Patent
Wang et al.

(10) Patent No.: US 6,317,290 B1
(45) Date of Patent: Nov. 13, 2001

(54) ADVANCE POLE TRIM WRITER WITH MOMENT P1 AND LOW APEX ANGLE

(75) Inventors: Lien-Chang Wang, Fremont; Zhupei Shi, San Jose; Syed Hossain, Fremont; Billy W. Crue, Jr., San Jose; Song Pang, Fremont, all of CA (US)

(73) Assignee: Read-Rite Corporation, Fremont, CA (US)

(*) Notice: Subject to any disclaimer, the term of this patent is extended or adjusted under 35 U.S.C. 154(b) by 0 days.

(21) Appl. No.: 09/387,619

(22) Filed: Aug. 31, 1999

(51) Int. Cl.⁷ .................................................. G11B 5/31
(52) U.S. Cl. ............................................... 360/126
(58) Field of Search ............................................... 360/126

(56) References Cited

U.S. PATENT DOCUMENTS

| | | |
|---|---|---|
| 4,550,353 | 10/1985 | Hirai et al. . |
| 4,791,719 | 12/1988 | Kobayashi et al. . |
| 4,944,831 | 7/1990 | Sibuet . |
| 4,947,541 | 8/1990 | Toyoda et al. . |
| 5,116,719 | 5/1992 | Gau . |
| 5,282,308 | 2/1994 | Chen et al. . |
| 5,283,942 | 2/1994 | Chen et al. . |
| 5,285,340 | 2/1994 | Ju et al. . |
| 5,402,295 | 3/1995 | Suzuki et al. . |
| 5,438,747 | 8/1995 | Krounbi et al. . |
| 5,473,491 | 12/1995 | Fujisawa et al. . |
| 5,640,753 | 6/1997 | Schultz et al. . |
| 5,649,351 | 7/1997 | Cole et al. . |
| 5,719,730 | 2/1998 | Chang et al. . |
| 5,727,308 | 3/1998 | Leung et al. . |
| 5,734,531 | 3/1998 | Nix et al. . |
| 5,802,700 | 9/1998 | Chen et al. . |
| 5,804,085 | 9/1998 | Wu et al. . |
| 5,805,391 | 9/1998 | Change et al. . |
| 5,809,637 | 9/1998 | Rottmayer . |
| 5,828,533 | 10/1998 | Ohashi et al. . |
| 5,867,890 | 2/1999 | Hsiao et al. . |
| 6,108,167 | * 11/2000 | Tateyama et al. ................ 360/126 |
| 6,151,193 | * 11/2000 | Terunuma et al. ............... 360/126 |

* cited by examiner

*Primary Examiner*—Robert S. Tupper
(74) *Attorney, Agent, or Firm*—Carr & Ferrell LLP

(57) ABSTRACT

A magnetoresistive head having improved overwrite performance and a small trackwidth. The magnetoresistive head having a magnetic yoke formed of first and second poles joined at a back gap region and having an opposite write gap region. A pedestal with a top portion constructed of a high saturation moment material is provided on the first pole, limited to the write gap region and spaced from the read element so as to prevent popcorn noise in read sensor. The high moment pedestal is raised above surrounding structure causing the second pole to define a very low apex angle in the write gap region.

24 Claims, 8 Drawing Sheets

ADVANCE POLE TRIM WRITER WITH MOMENT P1 AND LOW APEX ANGLE

BACKGROUND OF THE INVENTION

This invention relates generally to magnetic disk data storage systems, and more particularly to magnetic write transducers and methods of making same.

Magnetic disk drives are used to store and retrieve data for digital electronic apparatuses such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a backgap portion 40, with these three elements collectively forming a yoke 41. The combination of a first pole tip portion 43 and a second pole tip portion 45 near the ABS are sometimes referred to as the yoke tip portion 46. A write gap 36 is formed between the first and second poles 32, 38 in the yoke tip portion 46. The write gap 36 is filled with a non-magnetic electrically insulating material that forms a write gap material layer 37. This non-magnetic material can be either integral with (as is shown here) or separate from a first insulation layer 47 that lies below the second yoke 38 and extends from the yoke tip portion 46 to the backgap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A. As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the coil layer from the first pole 32, while the coil insulation layer 50 electrically insulates the winds 49 from each other and from the second pole 38.

The configuration of the conductive coil 48 can be better understood with reference to a plan view of the read/write head 24 shown in FIG. 2B taken along line 2B—2B of FIG. 2A. Because the conductive coil extends beyond the first and second poles, insulation may be needed beneath, as well as above, the conductive coil to electrically insulate the conductive coil from other structures. For example, as shown in FIG. 3, a view taken along line 3—3 of FIG. 2A, a buildup insulation layer 52 can be formed adjacent the first pole, and under the conductive coil layer 48. As is well known to those skilled in the art, these elements operate to magnetically write data on a magnetic medium such as a magnetic disk 16 (see FIGS. 1A and 1B).

More specifically, an inductive write head such as that shown in FIGS. 2A–3 operates by passing a writing current through the conductive coil layer 48. Because of the magnetic properties of the yoke 41, a magnetic flux is induced in the first and second poles 32, 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a trackwidth of the write element, which defines track density. For example, a narrower trackwidth can result in a higher magnetic recording density. The trackwidth is defined by geometries in the yoke tip portion 46 (see FIG. 2A) at the ABS. These geometries can be better understood with reference to FIG. 3. As can be seen from this view, the first and second poles 32, 38 can have different widths W1, W2 respectively in the yoke tip portion 46 (see FIG. 2A). In the shown configuration, the trackwidth of the write element 28 is defined by the width W2 of the second pole 38. The gap field of the write element can be affected by the throat height TH, which is measured from the ABS to the zero throat ZT, as shown in FIG. 2A. The strength of the gap field strongly affects the over writing performance of a recording head. Thus, accurate definition of the trackwidth and throat height is critical during the fabrication of the write element.

However, the control of trackwidth, and throat height can be limited by typical fabrication processes, an example of which is shown in the process diagram of FIG. 4. The method 54 includes providing a first pole with first and second edges in operation 56. This operation can include, for example, forming a plating dam, plating, and then removing the dam. In operation 58, a write gap material layer is formed over the first pole. In particular, the write gap material layer is formed over an upper surface and the first and second edges of the first pole. Also, in operation 58, a via is formed through the write gap material layer to the first pole in the backgap portion 40 (see FIG. 2A). In the instance herein described, the write gap material layer extends above the first pole in the area between the yoke tip portion and the backgap portion, although in other cases the write gap material layer may not be above this area A buildup insulation layer is also formed in operation 60, adjacent the first and second edges, with the write gap material layer between the first pole and the buildup insulation layer. The buildup insulation layer is typically formed by depositing (e.g., spinning) and patterning photoresistive material and then hard baking the remaining photoresistive material. Such processes often result in the height of the buildup insulation layer being non-uniform and different than the height of the write gap material layer, as is illustrated in FIGS. 2A and 3.

The method 54 also includes forming a first coil layer above the write gap material layer and the buildup insulation layer in operation 62. This can include first depositing a seed layer above the first pole. Typically, photoresistive material can then be deposited and patterned. With the patterned photoresistive material in place, conductive material can be plated. With removal of the photoresistive material the remaining conductive material thereby forms the first coil layer.

In operation 64, the method 54 further includes forming a coil insulation layer above the first coil layer that is formed in operation 62. In addition, a second pole is formed above the coil insulation layer of operation 64, in operation 66.

Still another parameter of the write element is the stack height SH, the distance between the top surface of the first pole 32 and the top of the second pole 38, as shown in FIG. 2A. Of course, this height is affected by the thickness of the first insulation layer 47, the thickness of the coil layer 48 and any other coil layers that might be included, and the height Hi of the coil insulation layer 50 and any other coil insulation layers that might be included. The stack height can be an indicator of the apex angle α, which partially characterizes the topology over which the second pole must be formed near the yoke tip portion. Typically, the reliability of the write element decreases as the apex angle α increases. This is due, at least in part, to the corresponding increased difficulty, particularly in the yoke tip portion 46, of forming the second pole 38 over the higher topography of the stack. For example, the definition of the second pole width W, shown in FIG. 3, including photoresist deposition and etching, can be decreasingly reliable and precise with increasing topography. When demand for higher density writing capabilities drives yoke tip portions to have smaller widths W, this aspect of fabrication becomes increasingly problematic.

Also, with higher topography, when the second pole is formed, for example by sputtering or plating, the material properties of the second pole in the sloped region, adjacent the second pole tip region 45, can be undesirable. Thus, this decreased reliability results in undesirable lower production yield.

Adding further challenges to the design of recording heads, newer high end disk drive units require the maintenance of high over write performance for heads operating with sub-micron pole tips recording on high coercivity media. "Over write" is the recording of a new higher frequency signal on top of an older lower frequency signal. In order to meet these requirements such heads must impart a very strong fringing field using a yoke having a very small track width to provide high density recording capability. One method of meeting these design challenges is to use a high saturation moment material in the yoke 41, for example in the first pole 32. Such high saturation moment materials can be used to construct an entire first pole 32 or can be used on a portion of the first pole by constructing pedestals, not shown, at the write gap portion 46 and back gap 40 of the yoke.

Using such a high saturation moment material in the yoke 41 of a write head presents several difficulties. First, the use of a high saturation moment material in the first pole, especially in the back gap region has been found to contributed to "popcorn noise". Popcorn noise is the undesirable phenomenon which occurs when the magnetic domain boundary movement in the write element extends to the region of the read sensor. In such a case the read sensor will detect the magnetic signal as a spike or "pop". The greater the amount of high saturation moment material in use in the first pole of the write element, the greater the domain boundary expansion will be, especially when the back gap is also constructed of such a material.

Another problem with using such high saturation moment materials is their inherent corrosivity. The high temperatures required to cure the coil insulation layer 50 cause such materials to corrode. This corrosion problem has prevented such material from being used in magnetoresistive heads.

Therefore there remains a need for a write head which can take advantage of the magnetic properties of high saturation moment materials while eliminating popcorn noise and overcoming the corrosion problems inherent in the use of such materials. Such a head would preferably have a very low apex angle so as to provide improved magnetic flux characteristics and tolerance control in the manufacture of the second pole. Also, such a head would provide the ability to tightly control track width as well as stack height and the tolerances of the second pole.

SUMMARY OF THE INVENTION

The present invention provides a magnetoresistive head which uses a high saturation moment material to impart a strong fringing field while not exhibiting popcorn noise in an adjacently located read sensor. The head includes first and second magnetic poles joined to form the yoke having a closed end and an open end. The poles define therebetween a yoke interior. A pedestal constructed of a high saturation moment material is connected with the first pole at the open end of the yoke. The head also includes an electrically conducting coil, a portion of which passes through the interior of the yoke. The coil is electrically isolated from the yoke.

More particularly, the head includes a read element and a write element, both of which are built upon a ceramic substrate. The read portion includes a first magnetic shield and a second magnetic shield located thereover and separated by a distance. The space between the shields is filled with a first non-magnetic dielectric material in which a read sensor is embedded.

The second shield of the read element serves as a portion of the first pole of the write element. The first pole also includes a write gap pedestal formed at the ABS side of the first pole, and a back gap pedestal formed at the back gap end of the first pole. The write gap pedestal and back gap pedestal have upper surfaces which are smooth, flat and coplanar. A second layer of non-magnetic, dielectric material covers the first pole, extending beyond the edges thereof and has a smooth flat upper surface which is flush with the upper surfaces of the write gap and back gap pedestals.

A pedestal constructed of the high saturation moment material extends upward from the write gap pedestal, having a width somewhat less than that of the write gap pedestal. A thin layer of non-magnetic, electrically insulating write gap material covers the high saturation moment pedestal as well as the other pedestals and the second dielectric layer. The electrically conductive coil sits atop the write gap material, and is in the form of a planar helix constructed of copper and having inner and an outer contacts disposed outside of the yoke.

A coil insulation layer covers the coil and is formed so that it does not cover the pedestals. The coil insulation layer is also formed with vias at the locations of the coil contacts. The coil insulation layer is cured to form gradually sloping edges, and due to the increased height of the high moment pedestal, has an especially gradual slope at the edge adjacent that pedestal.

The second pole is formed over the first pole and over the coil insulation layer. Since the coil insulation layer has an especially gradual slope at the high moment pedestal, the second pole can likewise be formed to define an especially low apex angle. This low apex angle improves the magnetic flux flow properties of the yoke and also allows the second pole to be constructed with increased precision.

Locating the high moment material only at the top portion of the first pole pedestal effectively separates the high moment material effect from the read element, thereby reducing popcorn noise. Furthermore, providing the high moment material only at the write gap region of the yoke where it is needed, further reduces popcorn noise.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 1A:
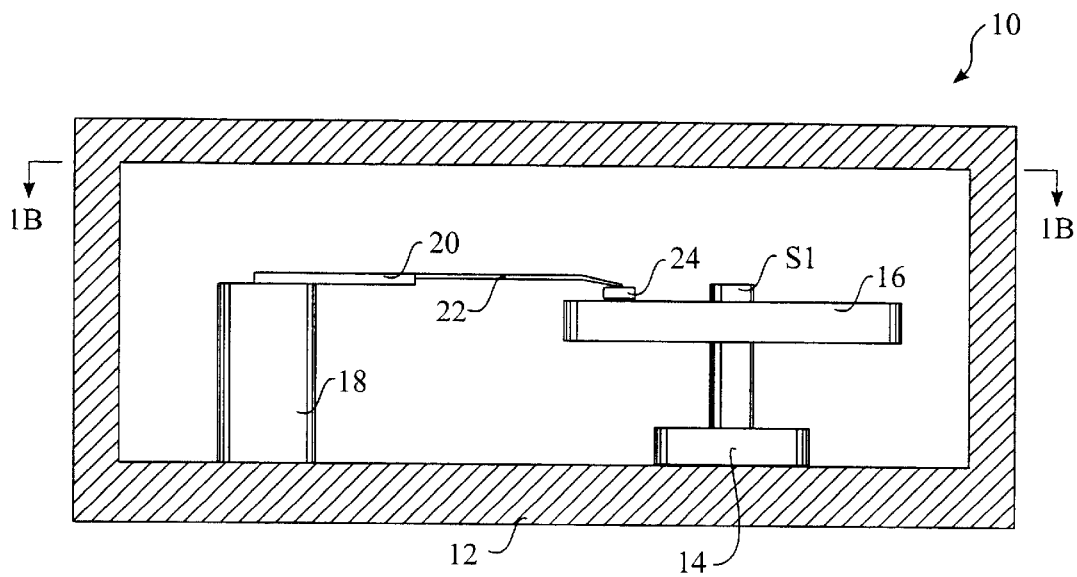
FIG. 1A is a partial cross-sectional front elevation view of a magnetic data storage system.
Figure 1B:
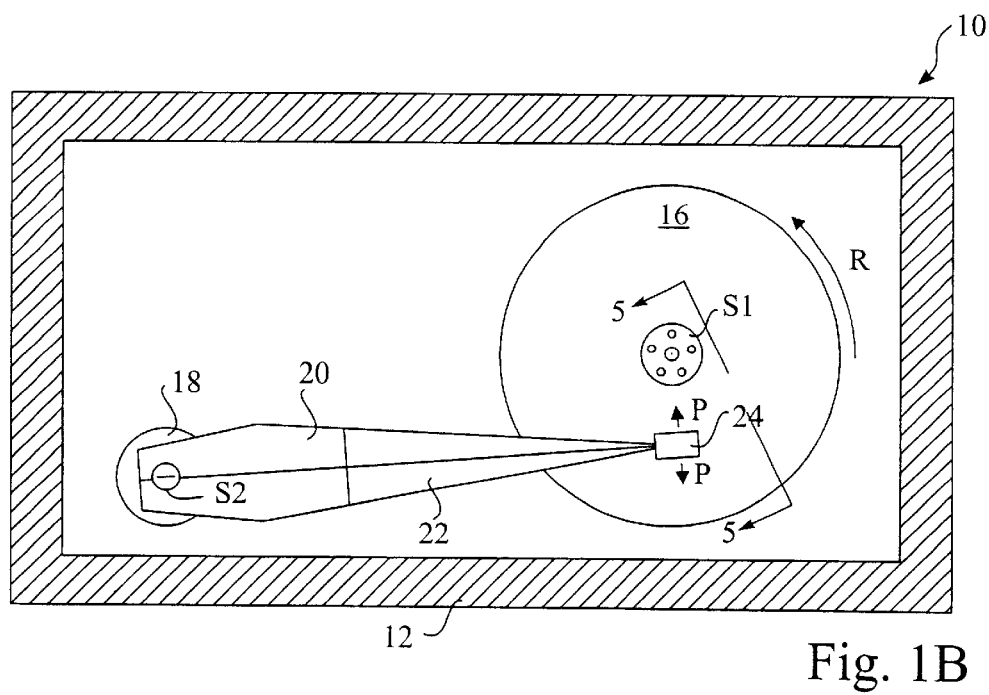
FIG. 1B is a top plan view taken along line 2B—2B of FIG. 2A.
Figure 2A:
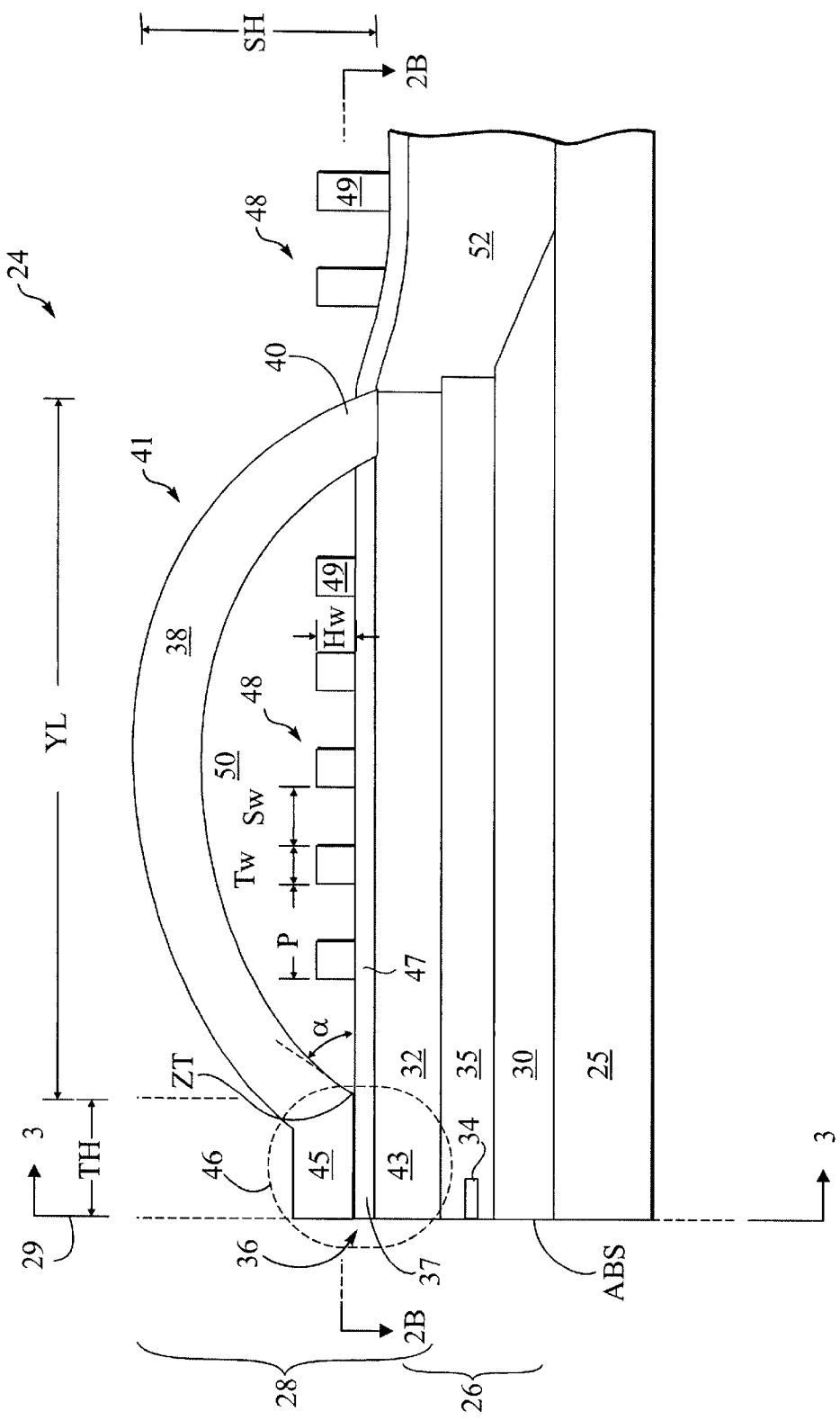
FIG. 2A is a cross-sectional view of a prior art read/write head of the magnetic disk drive assembly of FIGS. 1A and 1B.
Figure 2B:
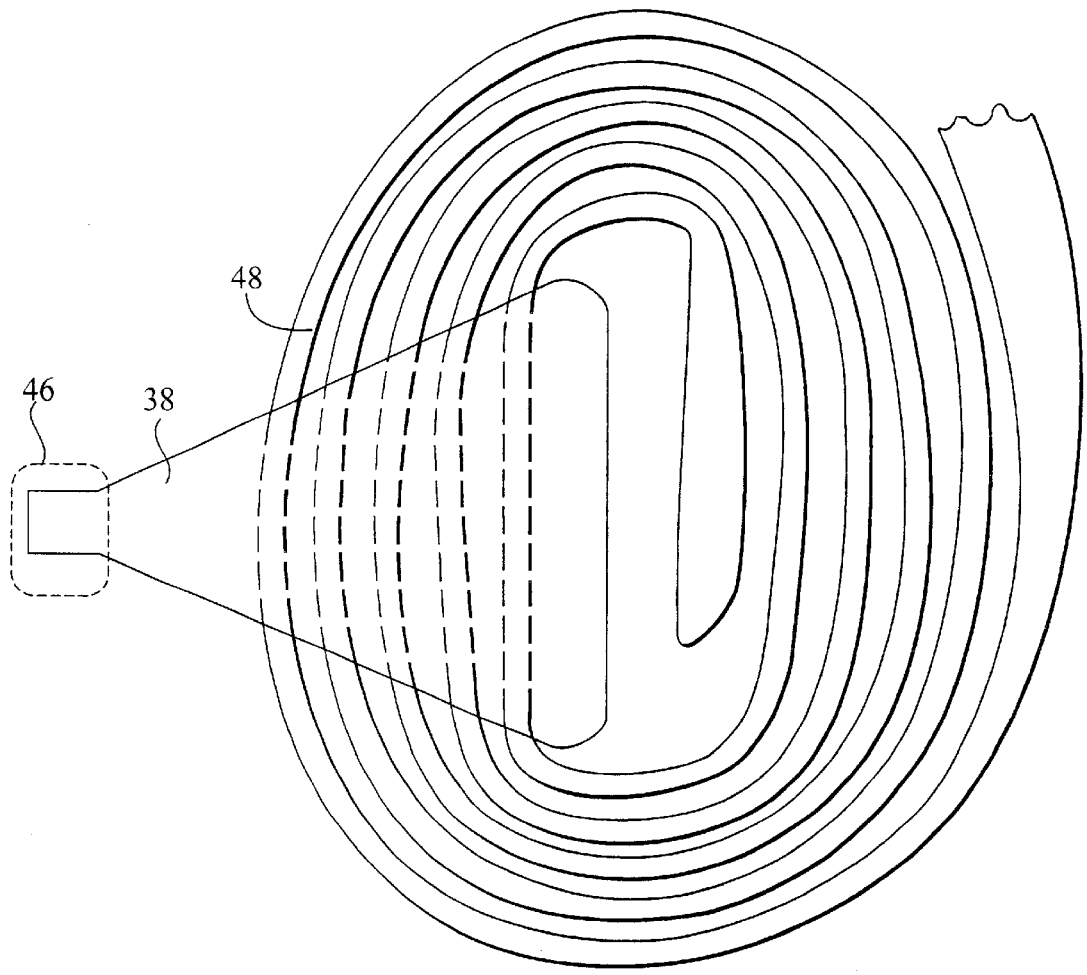
FIG. 2B is a plan view taken along line 2B—2B of FIG. 2A.
Figure 3:
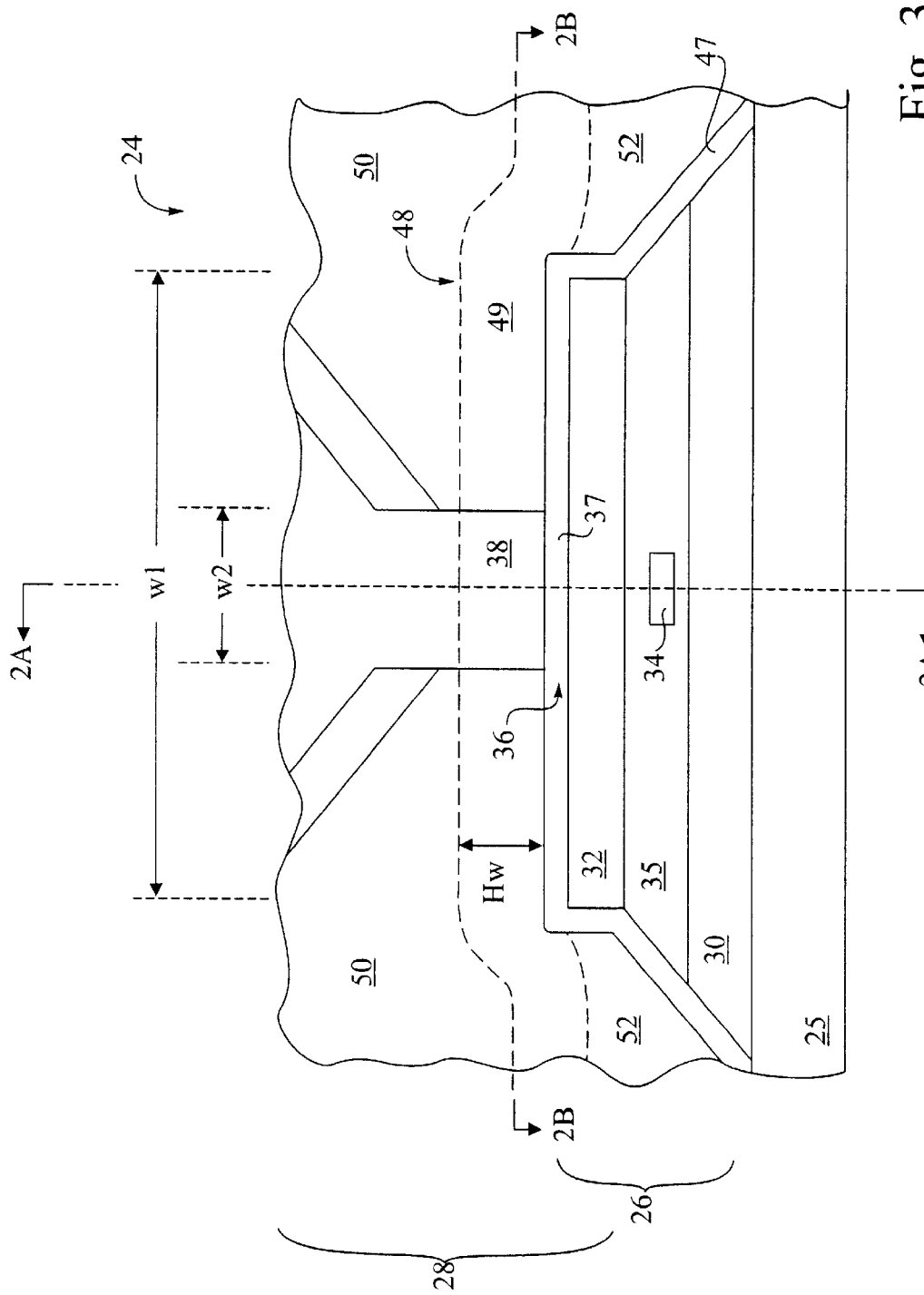
FIG. 3 is an ABS view taken along line 3—3 of FIG. 2A.
Figure 4:
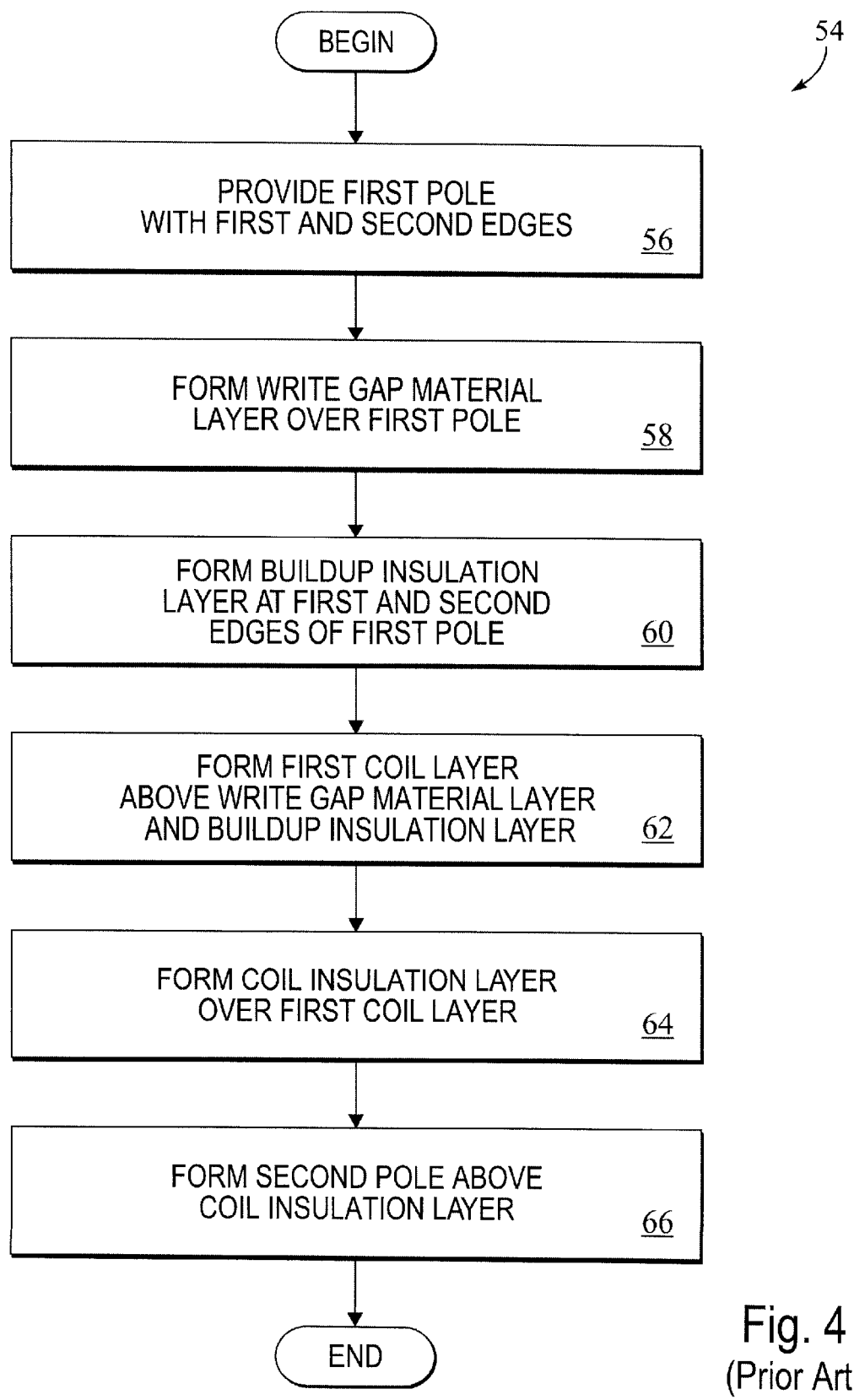
FIG. 4 is a process diagram of a method for forming a write element of the background art.
Figure 5:
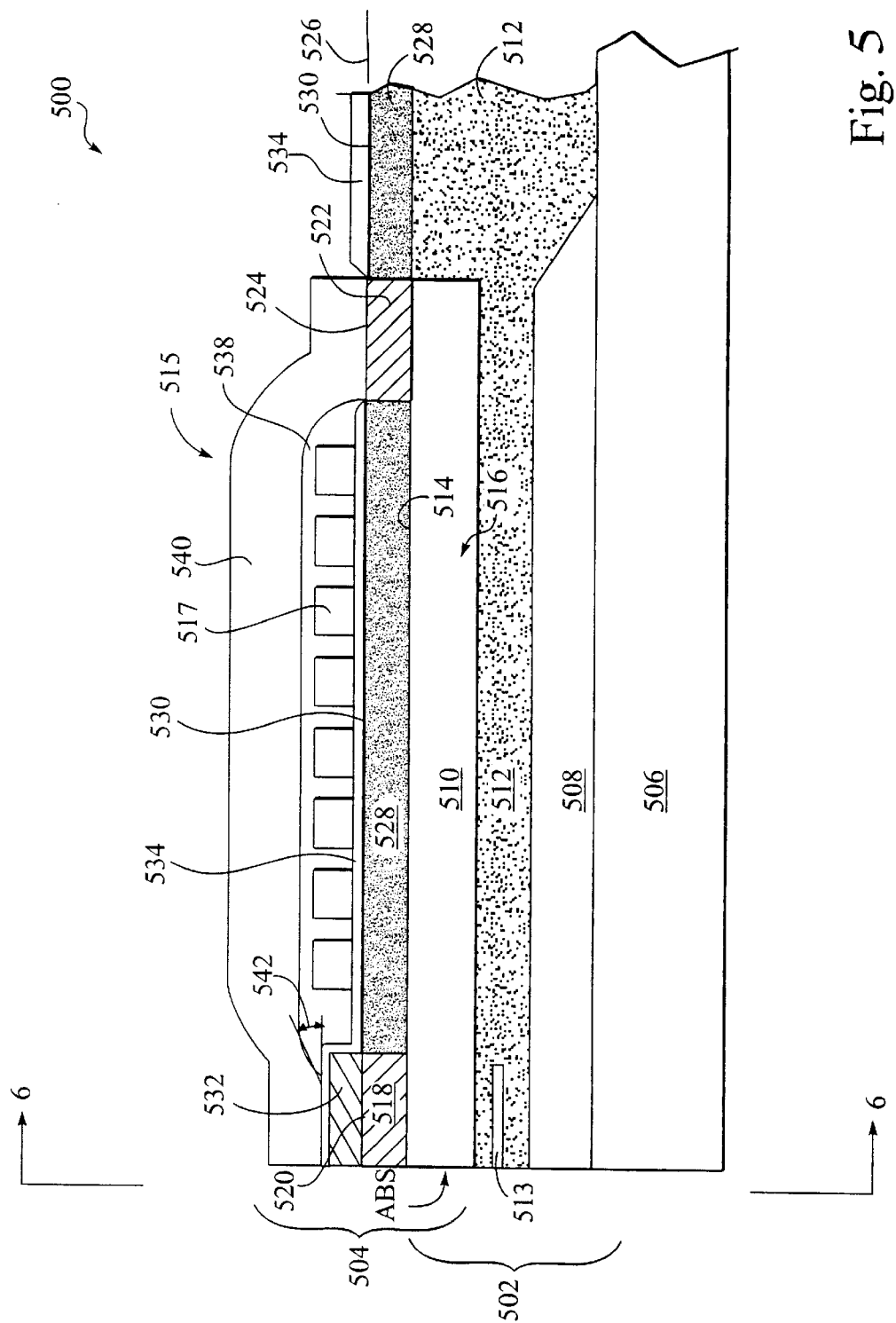
FIG. 5 is a cross sectional view of a read/write head of the present invention taken along line 5—5 of FIG. 1B shown expanded and rotated 110 degrees clockwise.

With reference to FIG. 5, the present invention is embodied in a combination read/write head, generally designated 500 including a read portion 502 and a write element 504, all of which is built upon a ceramic substrate 506. The read/write head 500 terminates at an end, the surface of which defines an air bearing surface (ABS).

The read portion 502 includes first and second shields 508 and 510 formed adjacent one another and separated by a distance. A first layer of dielectric material 512 is sandwiched between the first and second shield and a read sensor 513 is embedded within the dielectric layer at the end adjacent the ABS. The second shield 510 has a smooth planar upper surface 514. The dielectric layer 512 extends beyond the end of the first and second shields 506 and 510 opposite the ABS and also extends beyond the edges of the shields, as can be seen more clearly with reference to FIG. 6, to rise to a level flush with the smooth upper surface 514 of the second shield 510.

The write portion 504 of the read/write head 500 includes a yoke 515 having an open end adjacent the ABS and an opposite closed end. The yoke 515 includes a first pole 516 and a second pole 540 which define therebetween an interior through which passes a conductive coil 517 which is electrically isolated from the yoke 515.

With continued reference to FIG. 5, the second shield 510 serves as a portion of the first pole 516 of the write element 504. The first pole 516 also includes a write gap pedestal 518 which extends from the upper surface 514 of the second shield 510. The write gap pedestal has a smooth planar upper surface 520. Similarly, the first pole includes a back gap pedestal 522 which extends from the upper surface 514 of the second shield 510 at the end opposite the write gap pedestal. The back gap pedestal 522 has a smooth planar upper surface 524 which is coplanar with the upper surface 520 of the write gap pedestal 518, the upper surfaces 520 and 524 together defining a plane 526. While the shield 510, write gap pedestal 518 and back gap pedestal 522 could be constructed of any suitable magnetic material, they are preferably constructed of $Ni_{80}Fe_{20}$.

A second layer of dielectric material 528 is covers the second shield 510 of the first pole 516 and also extends over the first dielectric layer 512 in the area beyond the first pole 516. The second dielectric layer 528 has a smooth planar upper surface 530 which is flush with the upper surfaces 520 and 524 of the pedestals 518 and 522 across the plane 526. While the dielectric layer 528 could be constructed of any suitable dielectric material, it is preferably constructed of $Al_2O_3$.

Figure 6:
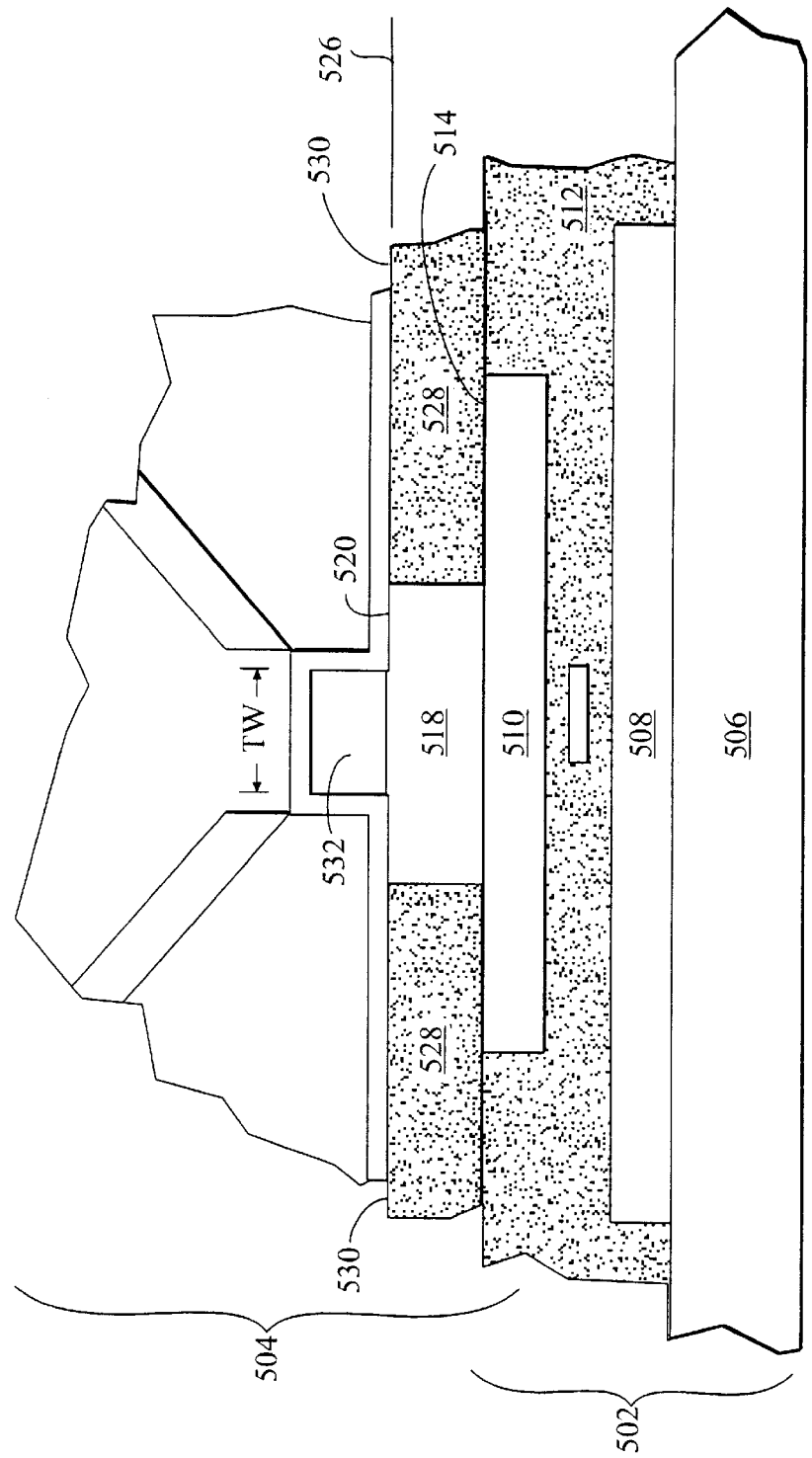
FIG. 6 is a cross sectional view taken along line 6—6 of FIG. 5.

With reference to FIGS. 5 and 6, the first pole further includes a high saturation moment. (high moment) pedestal 532. The high moment pedestal has a width which is relatively narrow compared with the write gap pedestal 518, as can be seen more clearly with reference to FIG. 6. The width of the high moment pedestal defines the track width (TW) of the w rite element 504. The smooth surface of the write gap pedestal 518 allows the high moment pedestal to be constructed with high precision to define a very narrow track width which allows the write element 504 to write data with a higher density, as described in the background of the invention. While the high moment pedestal 532 could be constructed of any suitable high moment material it is preferably constructed of $Ni_{65}Fe_{35}$, $Ni_{55}Fe_{45}$, $Ni_{45}Fe_{55}$, CoZrCr or FeXN, where X stands for Rh, Al, Ta, etc.

With continued reference to FIGS. 5 and 6, a layer of non-magnetic, electrically insulating write gap material 534 covers the high moment pedestal 532, second insulation layer 528, and the exposed portion of the write gap pedestal 518. The write gap material layer 534 can be formed of various non-magnetic, electrically insulating materials, however it is preferably formed of Alumina ($Al_2O_3$) or alternatively of $SiO_2$. The write gap material layer is formed so as not to cover the back gap pedestal.

Upon the write gap material, the coil 517 is formed. The coil is formed as an electrically conductive planar helix configured such that a portion thereof passes over the first pole 516 in the region between the write gap pedestal 518 and the back gap pedestal 522. While the coil can consist of any suitable electrically conducting material, it is preferably constructed of copper, plated onto the write gap material.

With reference to FIG. 5, a coil insulation layer, 538 covers the coil and the dielectric layer. The coil insulation layer 538 does not cover the high moment pedestal 532 and does not cover the back gap pedestal 524. In addition, vias are provided in the coil insulation layer to provide access to a pair of coil contacts, not shown. The coil insulation layer has gently sloping edges due to a curing procedure which will be discussed below. The edge of the coil insulation layer 538 adjacent the high moment pedestal 532 has a low slope due to the relatively high elevation of the high moment pedestal.

With the third coil insulation layer 538 deposited, a second pole 540 can be formed thereover. The second pole 540 contacts the write gap material 534 in the region of the high moment pedestal and also contacts the upper surface 524 of the back gap pedestal 522. While the second pole could be formed of any suitable magnetic material, it is preferably constructed of $Ni_{45}Fe_{55}$, deposited by plating.

The low slope of the third dielectric layer 538 in the region of the high moment pedestal causes the second pole 540 to have a very low apex angle 542. This is due to the fact that the dielectric layer does not have to rise very high above the high moment pedestal to cover the coil 517. This reduced apex angle allows the second pole to be constructed with a smaller and more accurately controlled track width as discussed in the Background of the Invention. The reduced apex angle 542 also improves flux flow characteristics through the second pole 540, leading to improved magnetic performance of the write element 504.

In operation, the high moment pedestal 518 allows efficient concentration of magnetic flux in the write gap portion of the yoke 515. This provides a significantly increased fringing field at the write gap, improving the overwrite characteristics of the write element 504 and beneficially allowing the write element to impart a signal on a high coercivity recording medium. The present invention eliminates popcorn noise in the read sensor 513 which would otherwise be caused by the use of such a high moment material. This is achieved by maintaining a sufficient distance between the high moment pedestal 532 and the read sensor 513, as well as by limiting the high moment material only to a small portion of the first pole 516. When constructing the high moment pedestal 532 of a high magnetostrictive material, the height of the pedestal must be limited to, for instance, between 1 and 2 times the thickness of the write gap, or limited to between 0.1 and 1 microns. More preferably the height is 1.5 times the thickness of the write gap or 0.5 microns.

Figure 7:
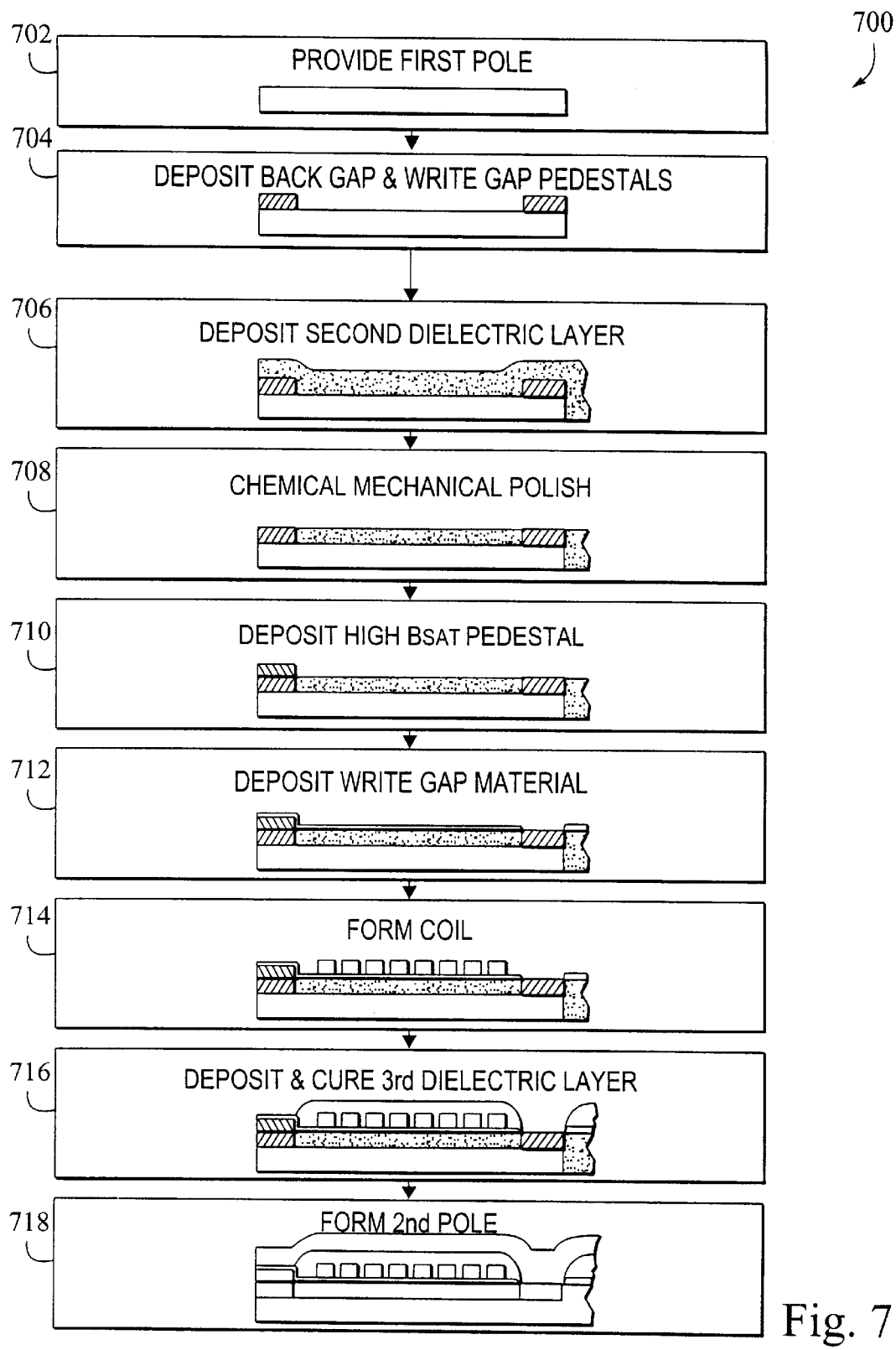
FIG. 7 is a process diagram of a method of forming a write element of the present invention.

With reference now to FIG. 7, a method 700 of forming a read write head of the present invention will be described. With the read element 502 having been already constructed according to methods of the background art, the method 700 begins with a step 702 of providing the second shield portion of the first pole 510. The shield 510 can be constructed of several magnetic materials, but is preferably $Ni_{80}Fe_{20}$. Then in a step 704, the write gap pedestal 518 and back gap pedestal 522 are formed. The pedestals 518 and 522 are also preferably constructed of $Ni_{80}Fe_{20}$ and are formed by masking and plating. Subsequently, in a step 706 the second dielectric layer 528 is deposited over the shield 510 as well as the write gap and back gap pedestals 518 and 524. In a step 708, the dielectric layer 528 is polished using a chemical mechanical polishing process. The polishing is performed sufficiently to expose and planarize the top surfaces 520 and 524 of the pedestals 518 and 522 thereby creating the smooth planar surface 530 of the dielectric layer across plane 526. Thereafter, in a step 710, the high moment pedestal 532 is constructed on top of the write gap pedestal 518. The high moment pedestal is preferably constructed of $Ni_{45}Fe_{55}$ deposited by masking and plating. Alternatively, the high moment pedestal is constructed of CoZrCr or FeXN, where X represents Rh, Al, Ta, etc., deposited by a sputtering process. However, with either choice of materials, the smooth planar surface 520 generated on the write gap pedestal 518 by the chemical mechanical polishing (CMP) process of step 708 allows the high moment pedestal to be constructed with extremely high precision to define a very narrow track width.

Subsequently in a step 712 the write gap material 534 is deposited over the high moment pedestal 532 and over the dielectric layer 528. The write gap material is locally removed at the location of the back gap pedestal 522 to expose the surface 524 of the back gap pedestal. This localized removal of the write gap material is performed by an etching process. Then, in a step 714, the coil 517 is formed over the write gap material 534. To form the coil, 517 a copper seed layer is first deposited over the write gap material 534. Then the coil is masked and plated in the desired configuration. After plating the coil the seed layer is removed by etching. In a step 716, the coil insulation layer is deposited. The coil insulation layer is preferably a spun photoresist. The photoresist is masked and exposed. The mask is then lifted off to remove the photoresist material from the high moment pedestal 532 and the back gap pedestal 522. The photoresist is also masked and lifted off to provide vias for providing access to coil contacts, not shown. The photoresist is then cured. Finally, in a step 718, the second pole 540 is formed. The second pole is preferably constructed can be constructed of a high magnetic moment material, preferably using $Ni_{45}Fe_{55}$ which can be deposited by plating.

Curing the photoresist material of the coil insulation layer gives it a gently sloping edge which advantageously allows the second pole to be formed with a low apex angle 542. However, the high moment material of the pedestal 532 is prone to corrosion at the high temperatures required to cure the photoresist. The present invention, however, solves this problem by covering the high moment pedestal 532 with the write gap material 534. This effectively prevents such corrosion of the high moment pedestal.

Conducting the CMP process provides a smooth planar surface on which to build the second pole 540. However such a process cannot be conducted after forming the high moment pedestal 532, because doing so would render impossible an accurate control the height of the high moment pedestal. By conducting the CMP process before building the high moment pedestal, it is possible to realize the advantages of the CMP process when constructing the second pole 540 without affecting the height of the high moment pedestal.

From the above it will be appreciated that the present invention provides a read write head capable of providing sufficient flux field to provide high overwrite performance even with the use of high coercivity recording media. Further the present invention exhibits such high performance write characteristics while avoiding undesirable popcorn noise in the read sensor. While the invention has been described in terms of a preferred embodiment, other embodiments of the invention, including alternatives, modifications, permutations and equivalents of the embodiments described herein, will be apparent to those skilled in the art from consideration of the specification, study of the Figures, and practice of the invention. Therefore, the embodiments and preferred features described above should be considered exemplary, with the invention being defined by the appended claims, which therefore include all such alternatives, modifications, permutations and equivalents as fall within the true spirit and scope of the present invention.

What is claimed is:

1. A head for use in high density data recording, comprising:
   first and second poles each including an open end and an opposite closed end, said poles being joined together at said closed ends and opposing each other at said open ends, an interior space being defined between said poles and between said open ends and said closed ends, said second pole being disposed above said first pole;
   a pedestal constructed at least partially of a high saturation moment material, said pedestal being connected with, and disposed above, said open end of said first pole, a write gap being defined between said pedestal and said second pole;
   an electrically conducting coil having a portion thereof passing through said interior space;
   a non-magnetic, electrically insulating write gap material layer disposed within said write gap and further disposed within said interior space between said first pole and said conducting coil;
   a dielectric layer disposed between said first pole and said write gap material layer; and
   an insulator disposed within said interior space and electrically isolating said coil from said second pole.

2. A head as recited in claim 1 wherein said pedestal has a height from 1 to 2 times the thickness of said write gap.

3. A head as recited in claim 1 wherein said pedestal has a height from 0.1 to 1 microns.

4. A head as recited in claim 1 wherein said pedestal is constructed of a material selected from the group consisting of $Ni_{55}Fe_{45}$, $Ni_{45}Fe_{55}$, CoZrCr, FeRhN, FeAlN, FeTaN.

5. A write head for high density data recording, comprising:
   a yoke including;
      a first magnetic pole having a front portion and an opposite back portion,
      a write gap pedestal disposed above the front portion and having a first upper surface substantially defining a plane,
      a high moment pedestal disposed above the write gap pedestal, and
      a second magnetic pole disposed above the first magnetic pole and having a back portion disposed above the back portion of the first magnetic pole;
   a dielectric layer disposed above the first magnetic pole and including a second upper surface that is substantially coplanar with the plane;
   a write gap layer disposed between the high moment pedestal and the second magnetic pole and disposed above the dielectric layer; and
   an electrically conducting coil disposed between the write gap layer and the second magnetic pole.

6. The write head of claim 5 wherein the yoke further includes a back gap pedestal joining the back portions of the two magnetic poles and having a third upper surface substantially coplanar with the plane, the dielectric layer being disposed between the write gap pedestal and the back gap pedestal.

7. The write head of claim 6 wherein the first pole, write gap pedestal, and back gap pedestal are each formed of $Ni_{80}Fe_{20}$.

8. The write head of claim 5 further comprising a coil insulation layer disposed between the conducting coil and the second pole.

9. The write head of claim 5 wherein the write gap pedestal defines a first width and the high moment pedestal defines a second width less wide than the first width.

10. The write head of claim 5 wherein the high moment pedestal is formed of a material having a higher magnetic moment than that of the first pole and has a thickness between 1 and 2 times the thickness of a write gap defined between the high moment pedestal and the second pole.

11. The write head of claim 10 wherein the thickness of the high moment material is between 0.1 and 1 microns.

12. The write head of claim 10 wherein the high moment material is selected from the group consisting of $Ni_{65}Fe_{35}$, $Ni_{55}Fe_{45}$, $Ni_{45}Fe_{55}$, CoZrCr, and iron nitride compounds including at least one additional element.

13. The write head of claim 12 wherein the additional element is Rh, Al, or Ta.

14. The write head of claim 5 wherein the second pole is formed of $Ni_{45}Fe_{55}$.

15. A read/write head, comprising:
   a yoke including;
      a first magnetic pole having a front portion and an opposite back portion,
      a write gap pedestal disposed above the front portion of the first pole and having a first upper surface substantially defining a plane,
      a high moment pedestal disposed above the write gap pedestal, and
      a second magnetic pole disposed above the first magnetic pole and having a back portion disposed above the back portion of the first magnetic pole;
   a first dielectric layer disposed above the first magnetic pole and including a second upper surface that is substantially coplanar with the plane;
   a write gap layer disposed between the high moment pedestal and the second magnetic pole and disposed above the dielectric layer;
   an electrically conducting coil disposed between the write gap layer and the second magnetic pole;
   a shield layer disposed below the first magnetic pole;
   a second dielectric layer disposed between the shield layer and the first magnetic pole; and
   a read sensor embedded within the second dielectric layer.

16. The write head of claim 15 wherein the yoke further includes a back gap pedestal joining the back portions of the two poles and having a third upper surface substantially coplanar with the plane, the first dielectric layer being disposed between the write gap pedestal and the back gap pedestal.

17. The write head of claim 16 wherein the first magnetic pole, write gap pedestal, and back gap pedestal are each formed of $Ni_{80}Fe_{20}$.

18. The write head of claim 15 further comprising a coil insulation layer disposed between the conducting coil and the second magnetic pole.

19. The write head of claim 15 wherein the write gap pedestal defines a first width and the high moment pedestal defines a second width less wide than the first width.

20. The write head of claim 15 wherein the high moment pedestal is formed of a material having a higher magnetic moment than that of the first magnetic pole and has a thickness between 1 and 2 times the thickness of a write gap defined between the high moment pedestal and the second magnetic pole.

21. The write head of claim 20 wherein the thickness of the high moment material is between 0.1 and 1 microns.

22. The write head of claim 20 wherein the high moment material is selected from the group consisting of $Ni_{65}Fe_{35}$, $Ni_{55}Fe_{45}$, $Ni_{45}Fe_{55}$, CoZrCr, and iron nitride compounds including at least one additional element.

23. The write head of claim 22 wherein the additional element is Rh, Al, or Ta.

24. The write head of claim 15 wherein the second magnetic pole is formed of $Ni_{45}Fe_{55}$.

* * * * *